United States Statutory Invention Registration [19]

[11] Reg. Number: H417

Miles

[43] Published: Jan. 5, 1988

[54] HEADSET FOR AMBIENT NOISE SUPPRESSION

[75] Inventor: Michael W. Miles, Huber Heights, Ohio

[73] Assignee: The United States of America as represented by the Secretary of the Air Force, Washington, D.C.

[21] Appl. No.: 21,926

[22] Filed: Mar. 5, 1987

[51] Int. Cl.[4] ..... H04B 15/00

[52] U.S. Cl. ..... 381/94; 381/92

*Primary Examiner*—Stephen C. Buczinski
*Assistant Examiner*—Linda J. Wallace
*Attorney, Agent, or Firm*—Bernard E. Franz; Donald J. Singer

[57] ABSTRACT

The headset system utilizes the theory that unique sound waves can be added or subtracted without loss of information to attenuate the noise at the ear and mouthpiece, without lowering the noise level of the environment. This allows for clearer reception and transmission of communication. The system includes a directional microphone mounted on a headset/helmet, isolated from both voice and earphone output, level-setting and frequency tailoring circuits, and voltage summers and amplifiers. The microphone picks up the ambient noise, and the level-setting and frequency tailoring circuits produce a close approximation of the noise at the ear and mouthpiece (i.e., two separate matching circuits). This signal is then inverted (using an inverting buffer) to provide destructive interference.

2 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEADSET FOR AMBIENT NOISE SUPPRESSION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a headset for ambient noise suppression.

Noisy environments, such as those found in launch facilities and aircraft cockpits, can muffle critical voice communications and cause hearing loss if exposure is prolonged.

U.S. Pat. No. 2,043,416 to Lueg discloses a process of silencing sound oscillations in which the sound oscillations to be silenced are reproduced by a reproducing apparatus in the form of sound waves of an opposite phase, and then adjustable means cause the elimination of the two sound waves. A publication by Dr. Faux-Williams of Cambridge University entitled "A Review Lecture, Anti-Sound", Sept. 8, 1984 Proc. R. Soc. London A. Vol 395, pp. 63–88 (attached) discloses the principles by which acoustic and vibrational fields can be mimicked and cancelled by secondary sources. Also of interest are U.S. Pat. No. 2,972,018 to Hawley et al, U.S. Pat. No. 4,025,724 to Davidson, Jr. et al, and U.S. Pat. Nos. 4,153,815 and 4,417,098 to Chaplin et al.

An article entitled "Noise Canceling Headset System Undergoes Developmental Tests" in *Aviation Week & Space Technology,* Nov. 24, 1986, pp. 58–59, discloses an acoustic noise canceling headset system for use by military pilots. The system was developed by the Biological Acoustics Branch of the U.S. Air Force Aerospace Medical Research Laboratory and Bose Corp., and is described in a technical report AFAMRL-TR-84-008, titled Active Noise Reduction, by John Carter, available from the National Technical Information Service (NTIS) as AD-A139741.

SUMMARY OF THE INVENTION

An object of the invention is to provide apparatus which, without lowering the noise level of the environment, attenuates the noise at both the ear and mouthpiece. This allows for clearer reception and transmission of communication.

The apparatus according to the invention comprises a headset system which utilizes the theory that unique sound waves can be added or subtracted without loss of information. The system includes a directional microphone mounted on a headset/helmet, isolated from both voice and earphone output; level-setting and frequency tailoring circuits, time delay circuits, and voltage summers and amplifiers. The microphone picks up the ambient noise, and the level-setting and frequency tailoring circuits produce a close approximation of the noise at the ear and mouthpiece (i.e., two separate matching circuits). The signal may then be phase-matched (to account for the spatial separation of the pickup and the earphone (or communication microphone) by the use of all-pass filters. This signal is then inverted (using an inverting buffer) to provide destructive interference, and added to the input signal before the amplification stage. This will effectively cancel noise at the earpiece and mouthpiece.

DETAILED DESCRIPTION

Figure 1:
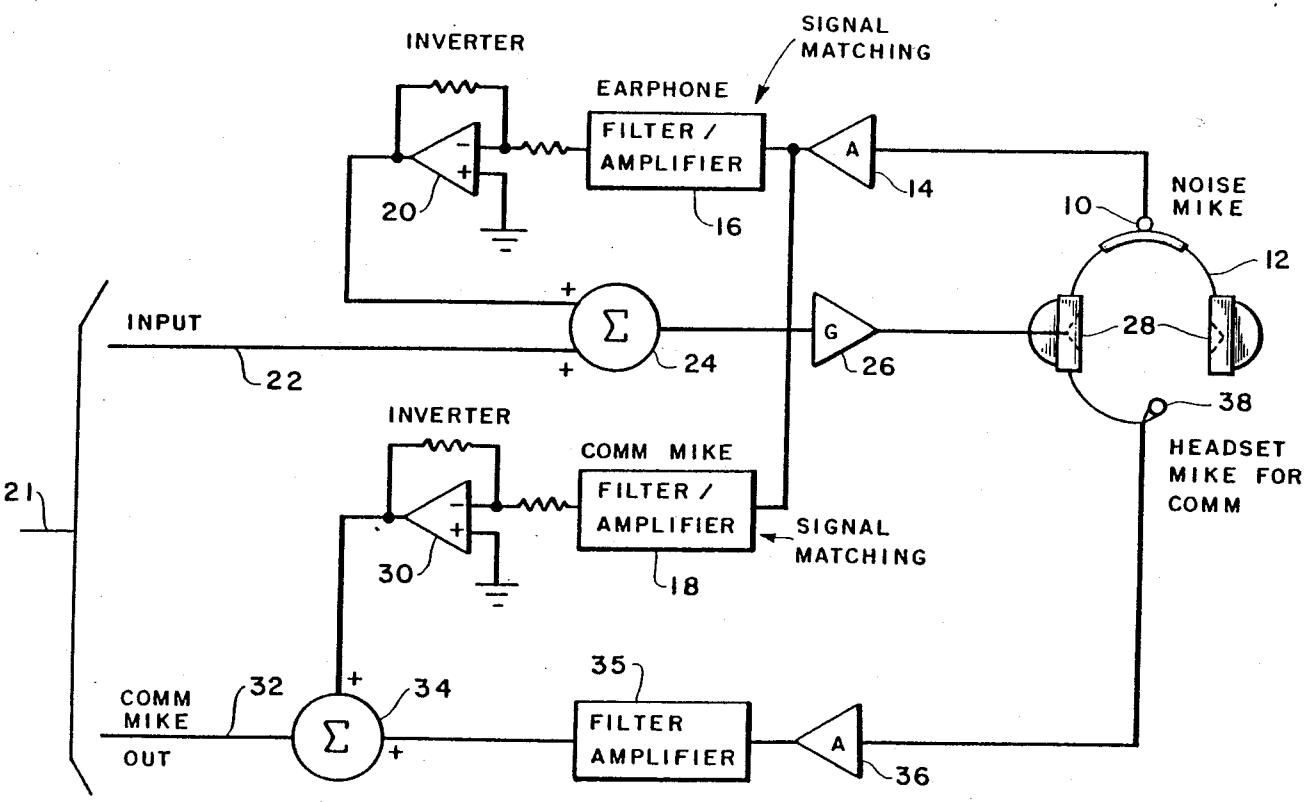
FIG. 1 is a generic system block diagram of a headset system for noise cancellation.

FIG. 1 is a system block diagram of a headset system for noise cancellation, which utilizes the theory that unique sound waves can be added or subtracted without loss of information. The figure is generic to account for many variances among headsets, helmets, input levels, etc. The system includes a directional noise microphone 10 mounted on a headset/helmet 12, isolated from both voice and earphone output; level-setting and frequency and time-phase-tailoring circuits, and voltage summers and amplifiers. FIG. 1 provides sufficient detail to permit a specific design once all parameters are defined.

The microphone 10 picks up the ambient noise, and the levelsetting frequency and phase-tailoring circuits, which are shown in FIG. 1 as a pre-amplifier 14 and two separate filter/amplifier matching circuits 16 and 18, produce a close approximation of the noise at the ear and mouthpiece, respectively. The signal from the earphone filter/amplifier circuit is then inverted using an inverting buffer 20 to provide destructive interference, and supplied as one input to a summing amplifier 24. A voice input signal on the receive line 22 of a communication line 21 is timematched and supplied as another input of the summing amplifier 24, and the added signal output is supplied via an amplification stage 26 to the earpiece 28.

The signal from the filter/amplifier circuit 18 for the communication microphone 38 is then inverted using an inverting buffer 30 to provide destructive interference, and supplied as one input to a summing amplifier 34. A voice input signal from the microphone 38 for communication is supplied via a pre-amplifier 36 and a filter unit 35 as another input of the summing amplifier 34, and the added signal output is supplied to the transmit line 32 of the communication line 21. This will effectively cancel noise at the mouthpiece.

Figure 2:
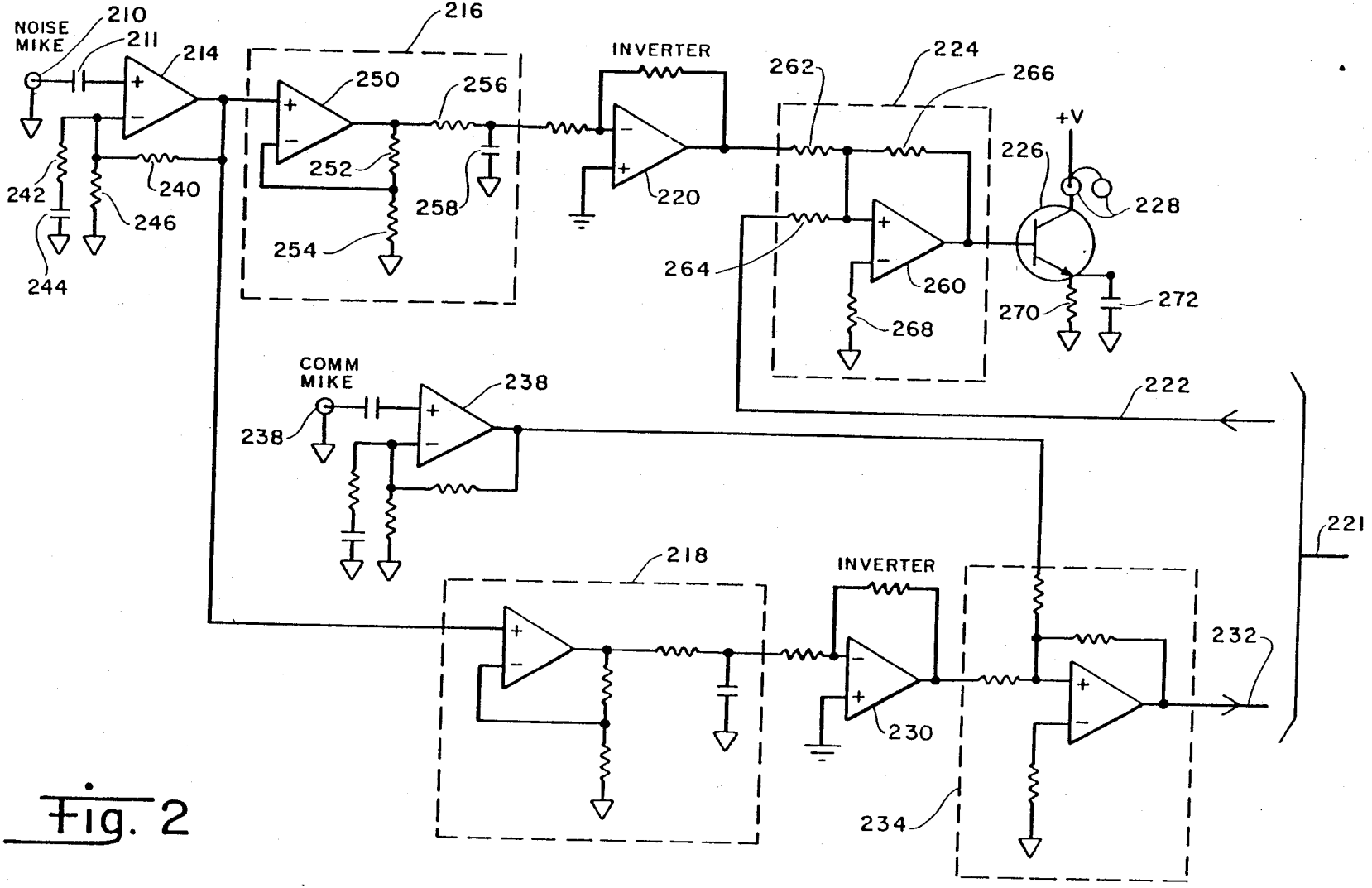
FIG. 2 is a functional block diagram of a more specific circuit corresponding to FIG. 1.

FIG. 2 is a functional block diagram of a more specific representative circuit, using operational amplifiers such as type 741. Component values. bias levels, and filter shapes would depend on the factors mentioned above. The signal from the noise microphone 210 is coupled via a capacitor 211 to the plus input of a representative pre-amplifier 214, which has its output coupled via a resistor 240 to the minus input. The minus input is biased via a resistor 242 in series with a capacitor 244 to ground, and also via a resistor 246 to ground.

The output of the pre-amplifier 214 is supplied in parallel to the signal matching filter/amplifier units 216 for the earphone and 218 for the communication microphone. In the earphone unit 216, a signal from the pre-amplifier 214 is connected to the plus input of a level amplifier 250, which has its output connected via a resistor 252 to the minus input, the minus input being also connected via a resistor 254 to ground. The output from the level set amplifier is coupled via a series resistor 256 and a shunt capacitor 258 to the minus input of the inverter buffer 220. The filter 256-258 illustrates the case of a headphone shell exhibiting first-order low pass characteristics. The filter/amplifer unit 218 and inverter 230 for the communication microphone are similar to the circuits 216 and 220, the filter in circuit 218 assuming that the head forms a first-order low pass acoustic filter.

The summing amplifier 224 has a first input connected to the output of the inverter buffer 220, and a second input connected to the receive path of a voice communication line 221. The two inputs are coupled via respective resistors 262 and 264 to the plus terminal of an op amp 260. The plus terminal is also connected via a resistor 266 to the output. The minus terminal is biased via a resistor 268 to ground. The summing amplifier 234 for the communication microphone is the same.

The output of the summing amplifier 224 is connected to the base electrode of a transistor amplifier, which has its collector electrode conneced as the output to the headset earphones 228, and its emitter electrode connected via a bias resistor 270 shunted by a capacitor 272 to ground.

The summing amplifier 234 has one input connected to the circuit from the communication microphone 238 via a preamplifier 236, the second input connected to the output of the inverter buffer 230, and its output connected to the sending path 232 of the voice communication line 221. The circuit for the preamp 236 may be similar to that of the preamp 216.

FIG. 2 assumes that time delays caused by spatial separation is negligible. To compensate for time delays, the filters 216 and 218 may be all-pass filters, using an RC configuration to pass all frequencies, but provide a constant phase shift.

Figure 3:
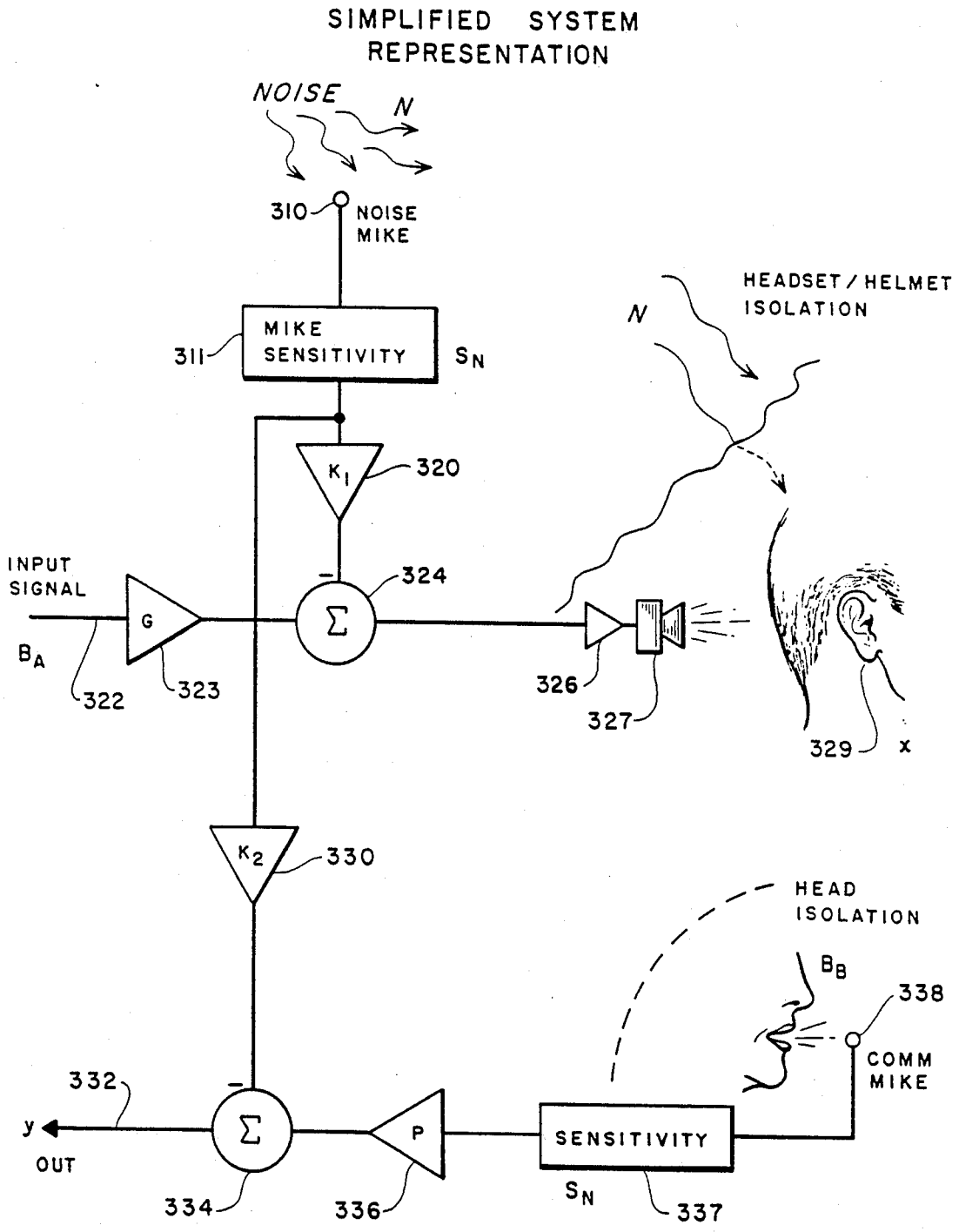
FIG. 3 is a simplified system representation for explaining the theory of operation.

FIG. 3 is a simplified system representation for giving the associated gain equations to determine the required voltage gains of the destructive interference amplifiers. For the received signal-headset analyses, let x equal the signal at the ear 329, $B_A$ be the input voice signal on line 322, G be the system gain represented as an amplifier 323 (Vout/Vin).

N equal to the ambient noise level (db), $S_N$ be the noise microphone sensitivity represented by a block 311 (Vout/db$_{in}$), $K_1$ be the preamp/destructive interference amp total gain represented by an amplifier 320 (Vout/Vin), the summing amplifier 324 have inputs from amplifiers 320 and 323 and output to a power amplifier 326, $I_s$ be the the headset/helmet isolation for the ambient noise N and the signal input to the headset amplifier 326 (db$_{out}$/db$_{in}$), and L be the combination gain represented by a power amplifier 326 and a loudspeaker 327, L(db$_{out}$/V$_{in}$).

To minimize noise at the ear:

$$x = (B_A G - N[S_N K_1]L + NI_s$$

$$= B_A GL - NS_N K_1 L + NI_s$$

$$= B_A GL - N(S_N K_1 L - I_s)$$

for N to approach zero, $$S_N K_1 L = I_s,$$

or $$K_1 = I_s / LS_N.$$

This gain should also preserve any frequency and time characteristics (or the headphone/helmet isolation, most importantly, and also microphone and speaker).

For the microphone output analysis, let y equal the signal output to the line 332, $B_B$ be the input voice signal at the communication microphone 338, G be the system gain represented as an amplifier 323 (Vout/Vin).

N equal to the ambient noise level.

$I_h$ be the the head isolation for the ambient noise N and the signal input to the headset amplifier 326 (db$_{out}$/db$_{in}$).

$S_c$ be the comm. microphone sensitivity represented by a block 337 (Vout/db$_{in}$).

P be the preamp gain represented by an amplifier 336 (Vout/Vin).

$K_2$ be the preamp/destructive interference amp total gain represented by an amplifier 330 (Vout/Vin), and the summing amplifier 334 have inputs from amplifiers 330 and 336 and output to line 332.

To minimize noise at the sending output:

$$y = (B_B + N I_h) S_C P - NS_N K_2$$

$$= B_B S_c P + NI_h S_c P - NS_n K_2$$

$$= B_B S_c P + N(I_h S_c P - S_N K_2)$$

for N to approach O, $$I_h S_c P = S_N K_2,$$

or $$K_2 = I_h S_c P / S_N.$$

Again, frequency variations must be taken.

Note that this technique will not be as effective because of the feedback from speech to the noise microphone. A cardiodpattern microphone would probably help alleviate this.

A concept validation test was performed using an omnidirectional dynamic microphone 410 (type sold under the trademark Realistic #33-985C) to perform the function of the noise pickup. The signal from this microphone was fed into a microphone preamp (type sold under the trademark Realistic microphone mixer #23 583), with the output inverted in phase using an op-amp inverter and fed via a filter and a summing amplifier into an integrated audio amplifier (NAD 3020). The amplifier drove a pair of headphones (type having the trademark K/6A). Because only one channel was utilized, an earplug was placed in the subject's left ear, while the right channel was active. The gain of the amplifier was set at an optimum level by ear.

The noise source was a 100 hertz square wave amplified through a loudspeaker. A square wave was chosen because of its wide spectrum. The noise could be characterized as "very loud ".

In spite of the limitations of this simple test, there was a marked reduction in the perceived noise level, especially in the fundamental region.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A headgear system for noise cancellation which utilizes the theory that unique sound waves can be added or subtracted without loss of information, comprising a directional noise microphone mounted on headgear, isolated from both voice and earphone output, a receiving destructive interference unit and a separate sending destructive interference unit, each of which includes signal conditioning means in tandem with phase inverting means, the receiving destructive interference unit having an input coupled to the noise microphone and an output coupled to receiving summing means, the sending destructive interference unit having an input coupled to the noise microphone and an output coupled to a sending summing means, with each signal conditioning means comprising level-setting and frequency tailoring circuits, the receiving summing means having another input coupled to a line for receiving voice signals and an output coupled to earphone means of the headgear, the sending summing means having another input coupled to a communication microphone of the headgear and an output to a line for sending voice signals.

2. A headgear system for noise cancellation which utilizes the theory that unique sound waves can be added or subtracted without loss of information, comprising a directional noise microphone mounted on headgear, isolated from both voice and earphone output, to pick up the ambient noise, a noise pre-amplifier coupled to the noise microphone, a receiving filter/amplifier matching circuit and a separate sending filter/amplifier matching circuit, each having a level-setting amplifier coupled to an output of the noise pre-amplifier followed by a frequency and time-tailoring filter circuit, to produce a close approximation of the noise at the ear and mouthpiece, respectively;

a receiving inverting buffer coupled to an output of the receiving filter/amplifier circuit for inverting the phase to provide destructive interference, an output of the receiving inverting buffer being supplied as one input to a receiving summing amplifier, a voice input signal on a receive line being supplied as another input of the receiving summing amplifier, and the output of the receiving summing amplifier being supplied via an amplification stage to the earphone, to effectively cancel noise at the earpiece;

a sending inverting buffer coupled to an output of the sending filter/amplifier circuit for inverting the phase to provide destructive interference, an output of the sending inverting buffer being supplied as one input to a sending summing amplifier, a voice signal from a communication microphone in the headgear being supplied via a pre-amplifier to another input of the sending summing amplifier, and the added signal output from the sending summing amplifier being supplied to a transmit line to effectively cancel noise at the mouthpiece.

* * * * *